United States Patent [19]
Reynolds et al.

[11] 3,798,450
[45] Mar. 19, 1974

[54] APPARATUS FOR DETECTING CORRUGATION OF STRIP MATERIAL

[75] Inventors: Patricia May Reynolds; Roger David Diamand, both of London, England

[73] Assignee: The British Non-Ferrous Metals Research Association, London, England

[22] Filed: May 31, 1972

[21] Appl. No.: 258,374

[30] Foreign Application Priority Data
June 1, 1971  Great Britain.................... 18281/71

[52] U.S. Cl. ... 250/209, 250/219 DF, 250/219 WE, 356/120, 356/199
[51] Int. Cl... G01b 11/30, G01n 21/18, G01n 21/30
[58] Field of Search ........... 356/120, 199, 152, 153; 250/219 DF, 219 WE, 209

[56] References Cited
UNITED STATES PATENTS
3,590,258  6/1971  Shibata .............................. 356/120

OTHER PUBLICATIONS
Beck et al., "Surface Analysis," IBM Technical Disclosure Bulletin, Vol. 12, No. 12, page 2335, May 1970.

*Primary Examiner*—James W. Lawrence
*Assistant Examiner*—T. N. Grigsby
*Attorney, Agent, or Firm*—Cushman, Darby & Cushman

[57] ABSTRACT

Apparatus for detecting waviness of a strip material includes two or more optical systems spaced laterally across the strip for detecting waviness of the strip along spaced lines parallel to the length of the strip, each such system being arranged to direct a beam of light at a region of the sheet, means responsive to the deflection of the light reflected from the said region for producing a signal proportional to the average or integral of the square of the deflection of the reflected light from its direction when the strip is flat, the said deflection, and means for producing relative movement between the optical system and the strip along the length of the latter. Means may be provided for subtracting the signal that is the minimum from one optical system representing the minimum waviness, from each of the signals from the other optical systems.

10 Claims, 7 Drawing Figures

FIG. IA.

APPARATUS FOR DETECTING CORRUGATION OF STRIP MATERIAL

This invention relates to apparatus for detecting waviness or lack of flatness, often referred to as bad shape, of strip material, and is concerned with the testing of sheet or strip material (referred to herein as strip material) which is intended to lie flat or be capable of lying flat, to detect distortion, due to curvature in two dimensions, which prevents it from lying flat. Strip in coiled form is naturally bent or curved in one dimension but provided there is no curvature in a second dimension it can be unrolled so as to conform to a flat surface. On the other hand during the process of rolling, the rolls are liable to bend slightly, due to the heavy forces imposed upon them, and even if allowance is made for this by the shaping of the rolls, conditions may vary and the reduction in thickness of the strip in passing through the rolls may not be quite uniform throughout its width, so that for example the natural length of the strip at its edges may be greater or less than its natural length in the middle. With thick material this may take the form of locked-up stresses, whilst with thin material it may result in waviness or wrinkling of the edges or buckling or corrugation of the middle.

Various forms of apparatus have been proposed for detecting such wrinkling, for example with the aid of sensors responsive to pneumatic, magnetic, or eddy current effects, or employing feelers which actually engage the surface of the strip.

According to the present invention apparatus for detecting waviness of a strip material includes an optical system for directing a beam of light at a region of the sheet, means responsive to deflection of the light reflected from the said region for producing a signal proportional to a function of the said deflection in particular a signal proportional to the average or integral of the square of the deflection of the said reflected light from its direction when the strip is flat, and means for producing relative movement between the optical system and the strip along the length of the latter.

The characteristics of waviness of the type in question have been investigated and discussed by W.K.J. Pearson in the Journal of the Institute of Metals 1964–65 Volume 93 Page 169 onwards. A typical form is that in which the edges of the strip are longer than the middle, resulting in a waviness of the edge when the strip is laid on a flat surface. Alternatively if the middle is too long it may result in a wavy middle or in mudguard shapes. Whilst more complex types of bad shape can be developed it is in general possible to define them in terms of the distribution of the length discrepancy across the width of the strip, that is to say the difference between the length measured along the wavy surface and the corresponding direct length, as a proportion of the length. A difference of length discrepency of 100 $\times 10^{-4}$ (i.e., one percent length discrepency) represents a very bad shape whilst $1 \times 10^{-4}$ is a very good one, and a range from 1 to $20 \times 10^{-4}$ is in general of interest.

The present invention is based on the fact that a particularly convenient measure of the length discrepancy is the variation in the inclination of the surface to a flat reference surface lying generally parallel to the strip. If at any point the inclination of the surface to the reference plane, measured in a plane (the measurement plane) containing the length of the strip and perpendicular to the reference plane is $\theta$, it can be shown that to a first approximation the length discrepancy is equal to half the average value of $\theta$ squared ($\theta$ being measured in radians).

Thus if the length between two points measured along the wavy or currugated surface (in a plane parallel to the length of the strip and perpendicular to the reference surface) is $l$, and the corresponding direct length (measured in a straight line along the reference surface) is x then the length discrepancy $l/x\text{-}1$ is approximately equal to $$\frac{1}{2x_1} \int_0^{x_1} \theta^2 dx.$$

. This is accessed in accordance with the invention by the inclusion of averaging or integrating means. Preferably the apparatus comprises two or more optical systems spaced laterally across the width of the strip, for detecting waviness of the strip along spaced lines parallel to the length of the strip.

Various arrangements may be employed for producing a signal which is a function of the deflection of the reflected beam from its direction when the sheet is flat, for example any of the arrangements described in "A New System for Optical Displacement Measurements" by R. Barrett (J. Sci. Instruments 1970 p 895 onwards). Thus the beam may be brought to a line focus extending at right angles to the direction of deflection on an opaque mask having in it a wedge-shaped slit through which a proportion of the light, depending on the deflection, passes to a photo sensitive device. In another arrangement the beam of reflected light is directed on to a pair of matched photo cells arranged side by side with their outputs connected in opposition, so that the net output is zero when the light is equally divided between the two photo cells.

The illuminating and detecting optical systems may be separate, with their axes inclined, or alternatively they may be coaxial and share a common collimating lens.

Further features and details of the invention will be apparent from the following description of one specific embodiment and certain modifications, given by way of example, with reference to the accompanying diagrammatic drawings, in which:-

FIG. 1A is a schematic diagram of the optical components of one of a number of optical systems for detecting waviness in accordance with the invention;

Figure 3B:
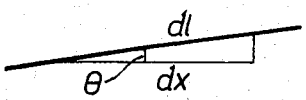
Figure 3A:
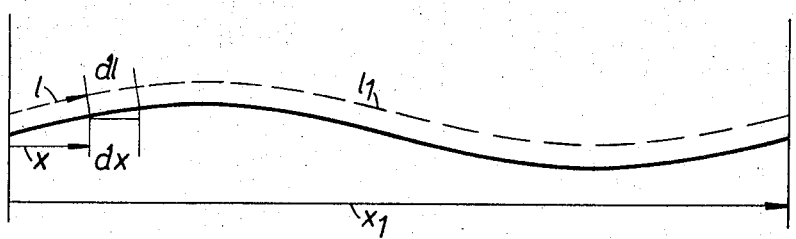
Figure 4:
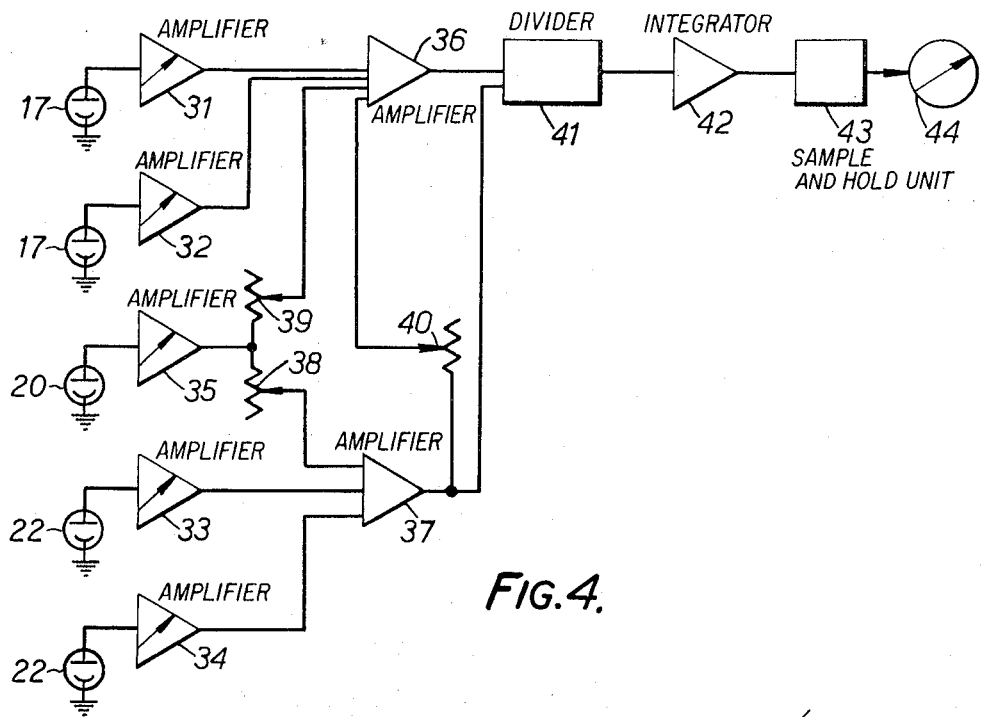
Figure 5:
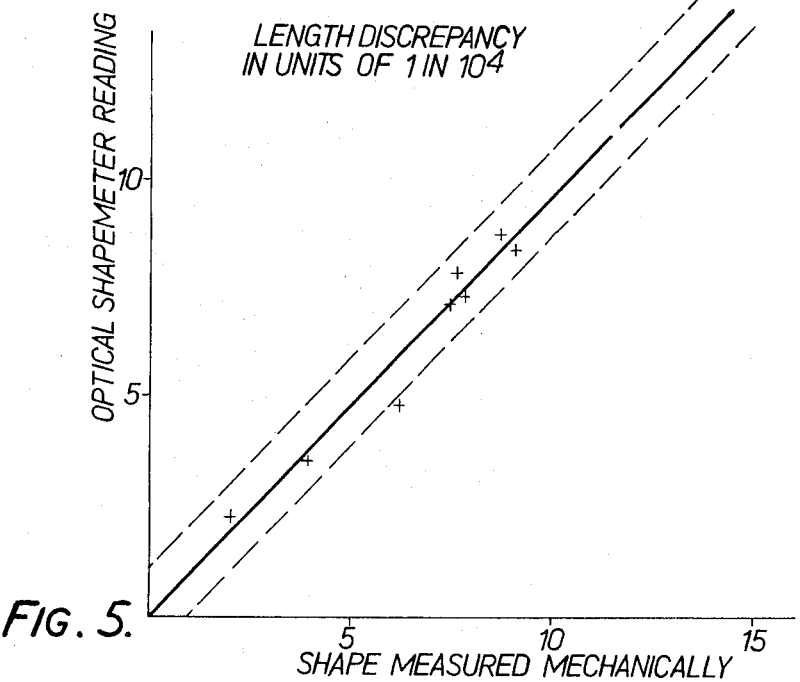

FIGS. 3*a* and 3*b* are diagrams illustrating the geometry on which the system is based;

FIG. 4 is a diagram of the electric circuit associated with one optical system;

FIG. 5 is a graph showing results obtained experimentally; and

Figure 6:
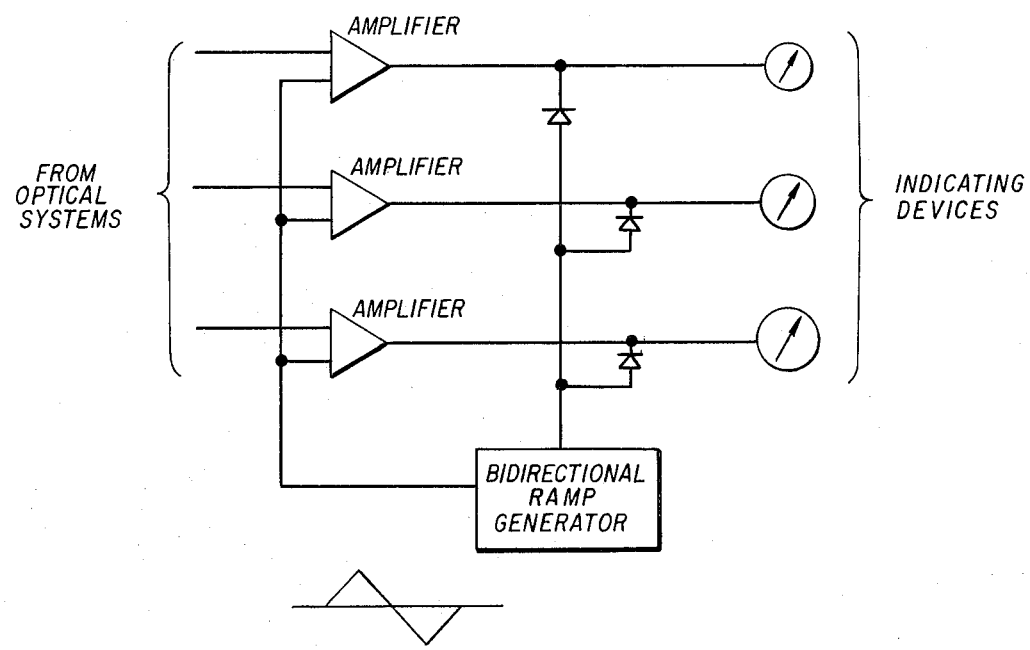

FIG. 6 is a diagram of an electric circuit utilized in processing the outputs of several optical systems.

In the embodiment to be described an apparatus for detecting waviness of a metal strip, as it travels longitudinally, comprises a stationary measuring head comprising a number of similar separate optical systems distributed across the width of the strip. Such an arrangement is illustrated in FIG. 1.

As shown in FIG. 1A each optical system comprises a lamp 10 with a spherical condenser lens 11 producing a parallel beam of light and a second condenser lens 12 of cylindrical or other astigmatic form to concentrate a line image of the light at a slit 13 forming part of an assembly comprising a pair of photo cells 17, which will be referred to as signal photo cells, situated one on each side of the slit 13 and each having in front of it a mask 16.

The slit 13 lies at or near the focus of a wide angle collimator lens 14 which directs on to the strip 15 being investigated a beam of light which is generally parallel in the measuring plane, that is to say in the plane of the paper, and is substantially perpendicular to the plane of the strip.

Figure 1:
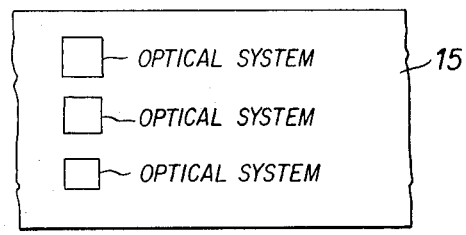
FIG. 1 is a schematic diagram of the general arrangement of optical systems employed according to the invention.

The diagram of FIG. 1 is not intended to be to scale and the form of the spot of light projected on to the strip, and in particular its width in a direction to right angles to the plane of FIG. 1, may vary as preferred. Thus if the light from the cylindrical condenser lens 12, in a plane at right angles to that of FIG. 1, is substantially parallel, the collimator lens may project a narrow line or elongated spot of light on to the strip 15. Alternatively, depending upon the particular dimensions of the system, the spot of light may be approximately as broad as it is long. In any event the length of the spot of light, as seen in FIG. 1, will be small in relation to the wave length of any corrugation or waviness of the strip being measured, whilst the width of the spot of light will be small in relation to the total width of the strip. In general these conditions will not be critical since the width of the strip will be anything from one to several feet, and the wave length of any waviness is commonly of similar dimensions, whereas the diameter of the collimator lens 14 in a specific embodiment will be no more than two or three inches.

The collimator lens 14 also serves to collect the light reflected from the strip and, when the strip is flat, return it to a line focus at the slit 13. If on the other hand the reflected light is deflected due to the tilt of the strip the line image will be shifted in a direction at right angles to the length of the strip 13 so as to impinge on one or other of the photo cells 17 through the corresponding mask 16.

Figure 2:
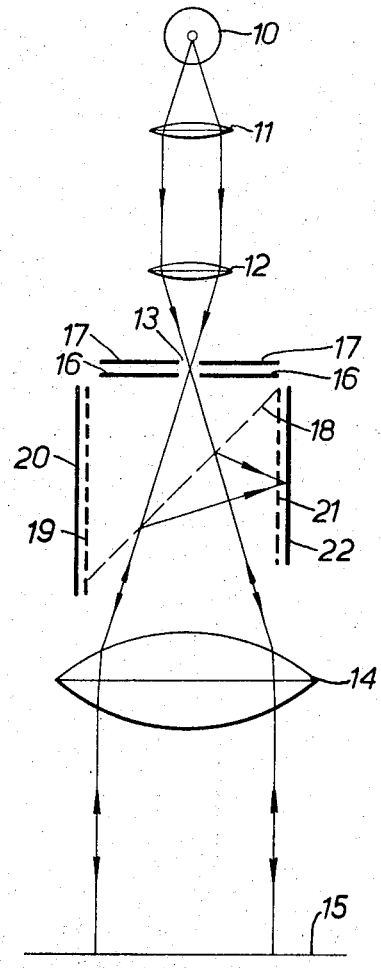
FIG. 2 is a view of a mask employed in the apparatus of FIG. 1A.
Figure 2:
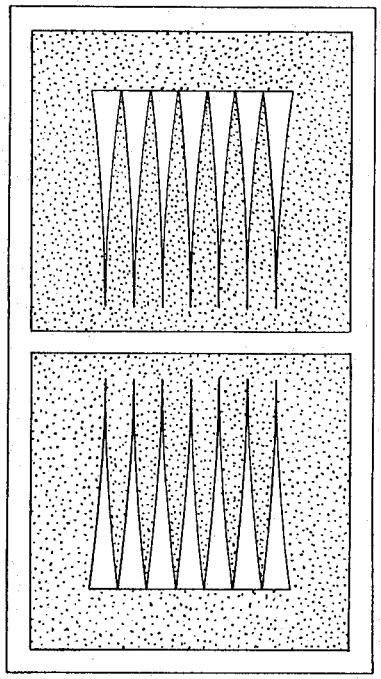

As shown in FIG. 2 each mask is formed with a large number of narrow wedge-shaped transparent windows separated by opaque areas and each extending at right angles to the slit, and having its apex adjacent to the slit. The wedge shaped windows are of parabolic form so that the transmission of the mask is proportional to the square of the distance from the slit, that is to say to $\theta^2$ where $\theta$ is the angle of tilt of the portion of the strip upon which the light is directed.

To compensate for errors due to variation of the intensity of the light source, a semi-reflecting beam splitter 18 is interposed between the collimator lens 14 and the masks 16. This directs a portion of the illuminating beam on to a photo cell or photo cells 20 which will be referred to as monitoring cells, and of which the output is handled as described below. Similarly to compensate for variation in the reflectivity of the strip, a pair of reference cells 22 are provided, and the beam splitter diverts a proportion of the deflected light to form an image on these. Each reference cell is provided with a reference mask corresponding only to the marginal portion of the signal mask, so that its output varies with the intensity but not the position, of the reflected beam.

As described below the outputs of the two signal photo cells 17 are added, the outputs of the two reference cells 22 are added, and, if there are two monitor cells, the output of these are also added. Thus if it is more convenient a single cell may be employed in each of these positions. in the case of the signal photo cell it is in any event convenient to employ two cells in order to provide the slit between them. In addition in the case of each of these cells it may not always be convenient to obtain a cell of sufficient area having uniform sensitivity throughout that area, and accordingly it may be convenient to employ two separate cells and possibly connect them to two separate amplifiers in order to enable their outputs to be balanced.

Both the monitor cell or cells and the reference cell or cells may be subject to a certain amount of scattered light in addition to that directly reflected by the beam splitter 18. In order to reduce the proportion of the scattered light each of these cells may be provided with a perforated screen 19 or 21. In each case this consists of a plate of any convenient opaque material having in it a large number of perforations whose diameter is comparable with the thickness of the sheet. This allows a substantial proportion of light striking perpendicularly to pass through it whilst considerably attenuating light reaching it at a substantial angle to the perpendicular.

FIGS. 3a and 3b are a geometrical diagram illustrating the mathematics upon which the apparatus is based. As indicated above the purpose of the apparatus is to assess the length discrepancy of the strip along a particular line, that is to say the difference between the length $l$ measured along the wavy surface of the strip and the corresponding direct length $x$, in relation to the direct length x. In other words the length discrepancy is equal to $l/x - 1$. FIG. 3b shows in elevation a small element of the length $dl$ of the strip, making an angle $\theta$ to the horizontal, the horizontal length of the small element being dx.

It is clear from the trigonometry of FIG. 3b that $dl/dx$ = sec $\theta$ so that the length discrepancy of the small element is equal to sec $\theta - 1$ or approximately $\theta^2/2$, ignoring $\theta^4$ fourth and higher powers.

Accordingly for a strip of length $x_1$ having at a uniform velocity of K centimetres per second, the length discrepancy in terms of distance x and of time t is given by $$\frac{t_1 - x_1}{x_1} = \frac{1}{x_1} \int_0^{x_1} \theta^2/2 \, dx = \frac{k}{x_1} \int_0^{x_1/k} \frac{\theta^2}{2} dt = \frac{1}{t_1} \int_0^{t_1} \frac{\theta^2}{2} dt$$

This length discrepancy is independent of $x_1$ or $t_1$ provided that the length examined is sufficient to provide a representative sample.

As already indicated the shape of the masks 16 is such as to provide an output signal proportional to the square of the deflection of the reflected beam i.e. proportional to $\theta^2$. It will thus be apparent from the mathematics indicated above that the processing apparatus required to give an output representing the length discrepancy should include an integrating or averaging circuit.

This processing apparatus is indicated as a block diagram in FIG. 4.

The outputs of the two signal photo cells 17 are supplied to a pair of operational amplifiers 31 and 32 whilst those of the reference photo cells 22 are supplied respectively to a pair of operational amplifiers 33 and 34 and that of the monitoring photo cell 20 to an operational amplifier 35.

The outputs of the amplifiers 31 and 32 are supplied to a further operational amplifier 36 by which they are added and similarly the outputs of amplifiers 33 and 34 are supplied to an amplifier 37 by which they are added.

A signal proportional to the output of the amplifier 35, the proportion being determined manually by a potentiometer 38 is also supplied to the amplifier 37 so as to be subtracted from the outputs of the amplifiers 33 and 34. Thus the output of the amplifier 37 represents the intensity of the reflected light minus an allowance for scattered light from the amplifier 35. A signal proportional to the output of the amplifier 35, the proportion being determined by a manually adjustable potentiometer 39, is also applied to the amplifier 36 as is a signal proportional to the output of the amplifier 37 the proportion being determined by a potentiometer 40. These two signals are both subtracted from the outputs of the amplifiers 31 and 32. Accordingly the output of the amplifier 36 represents the output of the measuring photo cells 17 corrected for variations of scattered light and corrected for variations of total reflected light.

Accordingly the output of the amplifier 36 divided by that of the amplifier 37 will represent the square of the angle of deflection ($\theta^2$) and accordingly these two outputs are supplied to a dividing network 41. The output of the dividing network 41 is supplied to an integrator 42 whereof the output is supplied to a sample and hold unit 43 and thence to a display 44.

The length discrepancy of a cut sheet, namely the average value of $\theta^2$, can be obtained in the case of cut sheets by integrating a signal representing $\theta^2$ from the start to the end of the sheet by means of the integrator, and displaying the output of this by means of the sample and hold unit.

In the case of continuous strips the pure integrating network comprising an operational amplifier with capacitive feed back may be replaced by an averaging network in which the operational amplifier has both resistance and capacitance in the feed back line. In this case the average value can be observed or recorded throughout the passage of the strip, or a "go no-go" device may be actuated whenever the average value exceeds a predetermined limit.

In a modification of the arrangement described only the greater of the two outputs from the amplifiers 31 and 32 is used at any one time, thereby decreasing the amount of background correction required from the potentiometers 39 and 40.

Where cut sheets are being examined, additional logic of any conventional nature may be provided to start and stop the integration of the signal.

It will be appreciated that many variations of the arrangement described are possible and fall within the invention. For example, instead of employing a mask shaped to give an output proportional to the square of the deflection, the output may be linearly proportional to deflection, in which case a squaring circuit may be incorporated whose output is proportional to the square of its input.

The integrated outputs of the several optical systems distributed across the strip, which as indicated above represent the length discrepancies of the associated lines on the moving strip, may be fed to any desired form of indicating, recording and/or control equipment. For example such equipment may provide a record of the amount of waviness of acceptable strip, while giving an alarm and operating a rejection device if the amount of waviness exceeds an acceptable limit.

In practice the apparatus may be used in different ways; for example a row of three or five measuring heads could be placed in a gantry under which cut sheets were passing on a conveyor belt. Each head would record the integrated value of $\theta^2$ over the length of each sheet and the values could be individually recorded for each head, or a difference, perhaps the maximum difference between any two heads, would give a measure of the worst features of the sheets.

In a preferred arrangement a signal corresponding to the output from the optical system which output is at a given time less than the outputs of any other system, is subtracted from the outputs of the other systems.

Thus it will be appreciated that a cut plate or a strip having no bad shape may be bent or subjected to single curvature which extends completely across its width, even though it may be capable of being flattened out. In this case the length discrepancy, as defined above, will be the same at different positions across the strip and the outputs of the optical systems will be equal. In other cases, where there is double curvature, it would generally be permissible to assume that the bad shape which it is desired to assess is the difference between the output of the optical system which is a minimum and the outputs of other optical systems.

For this purpose the output of each optical system may be applied to one of a set of further operational amplifiers together with the output of a common bi-directional ramp generator, the output of each of these amplifiers being applied to one of a number of indicating devices, as is illustrated in FIG. 6. These amplifier outputs are also connected through an AND gate, such as a set of diodes one for each amplifier, to control the bi-directional ramp generator. Thus so long as all the amplifier outputs are positive the diodes will be back biassed and the bi-directional ramp generator will produce a progressively increasing output, so that the outputs of all the operational amplifiers will be progressively decreasing. The moment one of these outputs passes through zero and tends to become negative, the corresponding diode will conduct and reverse the bi-directional ramp generator so as to prevent further increase of its signal, which will accordingly hunt about the value so reached, leaving the output of one operational amplifier in the region of zero, whilst the output of each of the others represents the difference between the output of its optical system and the output of the optical system which is a minimum.

The apparatus has been used on a cut-to-length line to examine metal sheets passing beneath the optical head on a conveyor. Selected sheets were removed from the conveyor and their shape at the same position in the sheet width was remeasured mechanically. FIG. 5 shows a typical comparison between these optical and mechanical measurements.

It will be appreciated that the invention is not limited to the specific embodiment described.

Thus in one alternative the extent of deflection of the beam is arranged merely to select one of a number of photo cells. Thus which ever one of a row of photo cells or of photo cells illuminated from a row of light-guides receives the maximum illumination will trigger a circuit giving an output which is chosen to depend on the position of the photo cell or light-guide but is independent of the photo cell output.

Accordingly the output will correspond to a function (e.g. the square) of the deflection in digital form. Moreover other arrangements may be employed for producing an output signal that is proportional to the deflection of the reflected light.

For example the reflected light, instead of being focused directly on signal photo cells through a mask, may be led to one or more photo cells through light guides, different light guides being arranged to receive the light according to the extent to which it has been deflected and being arranged to attenuate the light to an inversely corresponding extent. Further light guides arranged along the side of the signalling light guides may serve as a reference signal and have an attenuation independent of the extent of deflection so that no beam splitter is required.

Similarly in the preferred arrangement the function of the collimating lens and beam splitter in directing the return light to the signal and reference photo cells, could be carried out by the use of suitable light guides.

Again it will be appreciated that the ultimate signal need not correspond to the integral of the square of the deflection, for example in some cases the relevant criterion could be the maximum value of the deflection, or of the difference in deflection sensed by different optical systems at different positions in the width of the strip.

What we claim as our invention and desire to secure by letters Patent is:

1. Apparatus for detecting waviness of a length of material, including an optical system and means for producing relative movement between the optical system and the material along the length of the latter, the optical system comprising means for directing a beam of light at a region of the material and means responsive to the deflec-tion, about an axis transverse to the direction of relative movement, of the light reflected from said region, for producing a signal proportional to the average or integral of the square of the deflection of the reflected light from its direction when the material is flat.

2. Apparatus as claimed in claim 1 in which the optical system has a collimating lens common to the projected and reflected light and the photosensitive surface is formed in two portions separated by a narrow strip forming the source of projected light.

3. Apparatus as claimed in claim 1 including at least two optical systems arranged to detect waviness at regions spaced apart in a direction transverse to the direction of relative movement.

4. Apparatus as claimed in claim 3 including means for subtracting the signal that is the minimum from one optical system representing the minimum waviness, from each of the signals from the other optical systems.

5. Apparatus as claimed in claim 4 in which the means for subtracting comprise a bi-directional ramp generator, a subtracting amplifier for subtracting the output of the generator from each signal from each optical system, and an "and" gate causing the ramp signal to increase progressively so long as the difference between every output signal from every optical system and the ramp signal remains positive, but to cause the ramp signal to progressively decrease when any one of the output signals from one of the optical systems falls below the ramp signal.

6. Apparatus as claimed in claim 1 in which the optical system includes means for focussing light reflected from the material to form a line image on a photosensitive surface afforded by photosensitive means, tilting of the material about an axis transverse to its length serving to deflect the said image in a direction perpendicular to its length, and means for masking the photosensitive surface to produce zero output when the image is in a zero position formed by flat strip, and an output progressively increasing with movement in either direction from the zero position.

7. Apparatus as claimed in claim 6 in which the photosensitive surface is formed by two photosensitive cells provided with means for adding signals corresponding to their outputs.

8. Apparatus as claimed in claim 6 including a beam splitter directing part of the reflected light to a reference photosensitive surface to give a reference signal, and means for dividing a measuring signal from the photosensitive means by a signal derived from the reference photosensitive surface.

9. Apparatus as claimed in claim 6 in which said masking means is of parabolic form so as to give an output proportional to the square of the deflection.

10. Apparatus as claimed in claim 9 in which the masking means is divided into a large number of tapered wedge shaped windows to minimise the effect of variation of light intensity along the strip.

* * * * *